United States Patent
Howells et al.

(10) Patent No.: US 9,785,577 B2
(45) Date of Patent: Oct. 10, 2017

(54) KERNEL KEY HANDLING

(71) Applicant: Red Hat, Inc., Raleigh, NC (US)

(72) Inventors: David Howells, Cambridge (GB); Stephen John Gallagher, Methuen, MA (US); Simo S. Sorce, New York, NY (US)

(73) Assignee: RED HAT, INC., Raleigh, NC (US)

( * ) Notice: Subject to any disclaimer, the term of this patent is extended or adjusted under 35 U.S.C. 154(b) by 391 days.

(21) Appl. No.: 14/289,273

(22) Filed: May 28, 2014

(65) Prior Publication Data
US 2015/0347319 A1    Dec. 3, 2015

(51) Int. Cl.
G06F 11/30 (2006.01)
G06F 12/14 (2006.01)
G06F 12/02 (2006.01)

(52) U.S. Cl.
CPC ........ G06F 12/1408 (2013.01); G06F 12/023 (2013.01); *G06F 2212/1052* (2013.01); *G06F 2212/20* (2013.01)

(58) Field of Classification Search
CPC .............................. G06F 12/023; G06F 12/1408
See application file for complete search history.

(56) References Cited

U.S. PATENT DOCUMENTS

| | | | |
|---|---|---|---|
| 7,886,162 B2 | 2/2011 | Murase et al. | |
| 8,332,635 B2 | 12/2012 | Plouffe, Jr. et al. | |
| 8,332,636 B2 | 12/2012 | Murase et al. | |
| 8,422,674 B2 | 4/2013 | Murase et al. | |
| 8,667,267 B1* | 3/2014 | Garcia | H04L 63/0869 380/202 |
| 2004/0003271 A1* | 1/2004 | Bourne | G06F 21/10 713/193 |
| 2004/0107419 A1* | 6/2004 | Blackmore | G06F 9/544 718/100 |
| 2004/0133756 A1* | 7/2004 | Shaw | G06F 12/08 711/165 |
| 2008/0052468 A1* | 2/2008 | Speirs | G06F 13/4059 711/132 |
| 2008/0209132 A1* | 8/2008 | Chen | G06F 11/1435 711/141 |
| 2009/0024798 A1* | 1/2009 | Lyndem | G06F 17/30067 711/129 |

(Continued)

OTHER PUBLICATIONS

*Projects/Keyring Collection Cache*, http://k5wiki.kerberos.org/wiki/Projects/Keyring_collection_cache.

(Continued)

*Primary Examiner* — Farid Homayounmehr
*Assistant Examiner* — Suman Debnath
(74) *Attorney, Agent, or Firm* — Haynes and Boone, LLP (57) ABSTRACT

According to one example, a method performed by a computing system includes determining that a size of key data to be stored within a kernel memory is greater than a threshold value. The threshold value is based on a size value associated with maintaining the key data outside of the kernel memory. The method further includes allocating a block of memory within a volatile memory store, the block of memory being outside the kernel memory, storing the key data within the block of memory, and storing, within the kernel memory, a pointer to the key data.

20 Claims, 5 Drawing Sheets

(56) References Cited

U.S. PATENT DOCUMENTS

2014/0337585 A1* 11/2014 Grisenthwaite ..... G06F 12/1475
711/152

OTHER PUBLICATIONS

David Howells. *Keys: Kerberos Caching Support*, http://lwn.net/Articles/561820/ Aug. 1, 2013.
Sainath S Vellal. *A Device Mapper Based Encryption Layer for TransCrypt*, Department of Computer Science & Engineering Indian Institute of Technology Kanpur, http://cse.iitk.ac.in/users/dheeraj/mtech/sainath-vellal.pdf, Jun. 2008.

* cited by examiner

KERNEL KEY HANDLING

BACKGROUND

The present disclosure relates generally to a system kernel, and more particularly to methods and systems for handling keys that are stored within kernel memory.

A kernel is a piece of software that that abstracts the hardware so that applications running on the systems do not have to be concerned with hardware details. This is particularly important because the applications may be intended to run on various types of devices, both local and remote. The kernel translates the requests into data processing instructions for the processor and other components of a computer. The kernel also ensures that different applications running on a computer system do not have access to each other's program code except through proper channels. This helps ensure that malicious code does not adversely affect various applications.

The kernel can also maintain secure data such as authentication tokens, encryption keys, and other security related objects. The kernel makes use of kernel memory, which is a designated portion of a computing system's volatile memory space. The kernel memory provides specialized security for the control, storage, and escrow of various encryption and decryption keys used by the system. Specifically, the kernel provides this control by storing the keys inside kernel memory.

Kernel memory is generally treated differently than other memory with respect to paging. Paging is a process whereby blocks of data are moved between a volatile memory store and a non-volatile memory store. This is because there is generally a limited amount of space in the volatile memory store. Thus, data that is designated as pageable is regularly being moved in and out. Software applications are generally stored in non-volatile memory for long-term purposes and loaded into main memory (a volatile memory store) when they are to be executed by the computing system. But, the system is generally configured to not page out the kernel memory for various practical reasons.

Storing various objects such as authentication tokens in the kernel memory portion of main memory can result in various challenges. Particularly, some objects can be relatively large in size. For example, some objects may be one megabyte in size or more. If thousands of such objects are being stored within the kernel memory, then gigabytes of main memory are being used by the kernel memory. This reduces the size of the remaining available memory. This, in turn, causes a less efficient system. Thus, it is desirable to be able to store sophisticated encryption keys within the secure kernel memory, but not take away so much memory from the available memory pool.

SUMMARY

According to one example, a method performed by a computing system includes determining that a size of key data to be stored within a kernel memory is greater than a threshold value, the threshold value based on a size value associated with maintaining the key data outside of the kernel memory. The method further includes allocating a block of memory within a volatile memory store, the block of memory being outside the kernel memory, storing the key data within the block of memory, and storing, within the kernel memory, a pointer to the key data.

According to one example a method for key handling includes creating an instance of a big key data type for storage within a kernel memory, the memory being a non-pageable portion of a volatile memory store, creating a pageable shared memory object in the volatile memory store, storing key data associated with the instance within the shared memory object, and storing within the kernel memory and in association with the instance, a pointer to the shared memory object and overhead for the shared memory object.

According to one example a computing system includes a processor and a memory comprising machine readable instructions that when executed by the processor, cause the system to create a key for storage within a non-pageable kernel memory, determine that a size of the key is greater than a size of overhead used to store the key outside of the kernel memory, allocate a pageable block of memory within a volatile memory store, the block of memory being outside the kernel memory, store the key within the pageable block of memory, and store, within the kernel memory, a pointer to the block of memory and the overhead.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to be able to store sophisticated encryption keys within the secure kernel memory, but not take away so much memory from the available memory pool. Accordingly, principles described herein provide for methods and systems for key handling.

In one example, the kernel allows for a big key data type that includes encryption key data. An instance of the big key data type determines if the size of the encryption key data to be stored within the kernel is larger than a threshold amount. This threshold amount may correspond with the amount of overhead required to store the encryption key data outside of kernel memory. If the encryption key data is smaller than the threshold amount, then the key data will remain within the kernel memory. But, if the encryption key data is larger than the threshold amount, the system will allocate a block of memory outside the kernel memory to store the encryption key data. A pointer to the block of memory is then stored with the big key data type in kernel memory.

The block of memory may be, for example, a shared memory file to which only the kernel and the big key data type within the kernel has access. The shared memory file may be similar to a random access memory RAM disk, which is a virtual drive that exists within the main memory space. Additionally, the overhead data to maintain the shared memory file may be stored within the kernel memory in association with the respective big key data type instance. Because the bulk of the encryption data is stored outside the kernel memory, it can be paged out to non-volatile memory. Thus, the security of the kernel memory remains while larger encryption keys can be paged out to non-volatile memory, leaving more of main memory available for other purposes.

Figure 1:
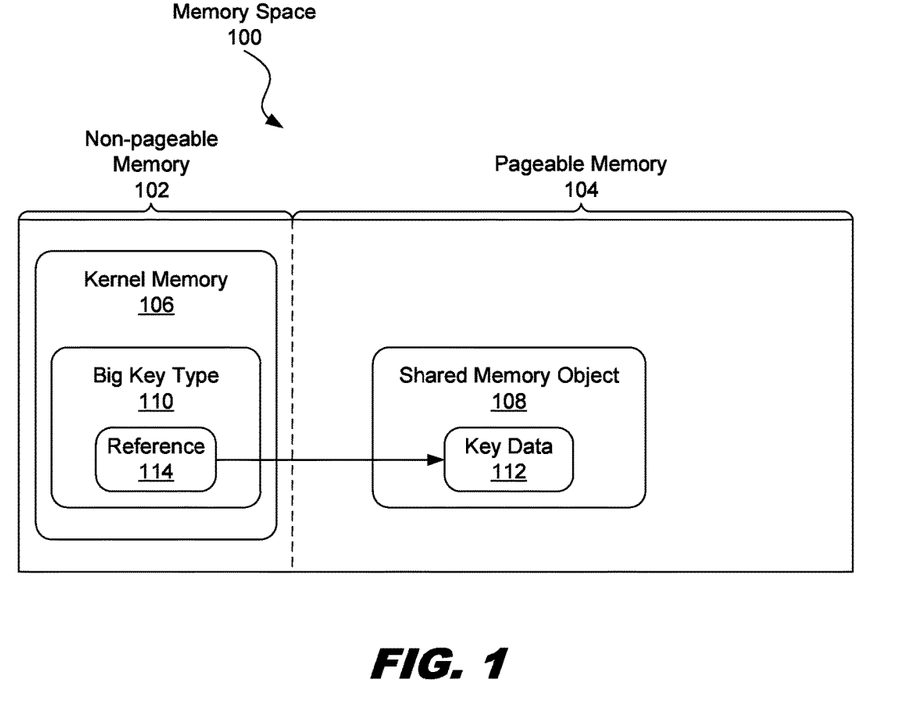
FIG. 1 is a diagram showing an illustrative volatile memory space, according to one example of principles described herein.

FIG. 1 is a diagram showing an illustrative volatile memory space 100. According to the present example, the memory space 100 is divided into non-pageable memory 102 and pageable memory 104. Practically, an object in memory may be designated as either pageable or non-pageable. For purposes of illustration, on object that is designated as pageable is in the pageable memory 104 and an object designated as non-pageable is in the non-pageable memory 104.

For various practical purposes, the kernel memory 106 is designated as non-pageable memory 102. According to the present example, the kernel memory 106 supports a data type referred to as a big key type 110. Under certain conditions, the key data 112 associated with the big key type 110 may be stored in a shared memory object 108 within pageable memory 104. An instance of the big key type may reference 114 the key data 112.

The memory space 100 represents the available memory of a volatile memory store. Many computing systems make use of a volatile memory store that is capable of random access. During runtime, program code (machine readable instructions) may be loaded from a non-volatile memory store (not shown) into the volatile memory store. The volatile memory store is often referred to as working memory. Program code within working memory can be accessed by a processing system much faster than it can be accessed from a non-volatile memory store. Computing systems have limits on the size of the working memory. For example, working memory may have, for example, one gigabyte, four gigabytes, or eight gigabytes of available storage space.

The memory space 100 may include objects designated as pageable and objects designated as non-pageable. The pageable memory 102 is able to be paged out to non-volatile memory. Because the available working memory space is limited, the contents within main memory are regularly swapped out with data stored in non-volatile memory. As different data is needed by the processing systems at various times, data is regularly being swapped out based on various functions designed to make efficient use of working memory.

The non-pageable memory 102 is memory that is generally not paged out to a non-volatile memory store. This may be done for a variety of practical reasons. The non-pageable memory 102 may include sensitive data used by the kernel or operating system. The various functions that are used to decide what data is to be paged are aware that certain objects of memory that are not to be paged out. In some cases, memory that is pageable or non-pageable can change as needed during normal operation of the computing system.

In some examples, the non-pageable memory 102 is not all within one contiguous region of physical memory. The physical memory locations that make up the non-pageable memory 102 may be located at various intermittent locations throughout the memory space 100. A memory management system may keep track of what memory addresses have been designated as pageable or non-pageable.

The kernel memory 106 is within the non-pageable memory portion 102. The kernel memory 106 is used to store various secure objects such as authentication tokens. For example, in a Linux system, the kernel memory 106 may include the kernel keyring, where keys that include such secure data are stored. Other types of computing systems may refer to the kernel memory differently.

Various applications or functions of the operating system may use sensitive data. This data may be packaged and referred to as a key. The secure data within a key will be referred to key data 112. Because such information may be sensitive, it is stored within the kernel memory 106, where it may be accessed by only the kernel. This ensures that the secure data is retrieved through the proper designated channels.

Some keys may only be approximately a kilobyte in length. But, in some circumstances, keys may be relatively large. For example, in some cases, these keys may be one or more megabytes in length. If thousands of such keys are stored within the kernel memory, then more memory addresses within the memory space 100 must be designated as non-pageable in order to accommodate the expanding kernel memory 106. The more space designated as non-pageable memory 102, the less space is designated as pageable memory 104. A smaller amount of pageable memory 104 will result in a less efficient system because data has to be swapped between the working memory and a non-volatile memory store more often.

According to certain illustrative examples, large keys can be stored as a big key data type 110. In one example, the big key data type is implemented as a class. The class includes specific data types for storing the actual key data 112. The class may also include methods for how to handle that data.

In one example, if the key data 112 is larger than a threshold amount, then that key data 112 is moved into a shared memory object 108 within pageable memory 114. A reference 114, or pointer, to the memory location of the key data 112 in the shared memory object 108 is maintained within the kernel memory 106 in association with the proper big key.

The shared memory object 108 may be designated as pageable memory 104 that is set up and maintained by the kernel. In one example, the shared memory object 108 may be similar to a RAM disk. A RAM disk is a region of volatile memory that is set up to be treated by the computing system as a secondary storage drive. For example, the computing system may treat the shared memory object 108 as a distinct hard drive for longer term storage, even though the physical memory space of the shared memory object 108 is within the volatile memory hardware.

The key data 112 includes the actual data that is stored in the kernel memory for the purpose of security. For example, if a key is used for storing an authentication token, then the key data may include the actual authentication token. Further, in the case that an instance of the big key data type stores an encryption key for decrypting files stored some-where by the computing system, then the key data 112 would include the actual encryption key.

When placing the key data 112 in the shared memory object 108, the means to access that shared memory object 108 is maintained in the kernel memory. For example, the big key data type 110 may maintain a reference 114, such as a pointer to the shared memory object 108 that includes the key data 112. Specifically, the reference 114 includes the physical or virtual memory address of where the shared memory object 108 has been set up within the pageable memory 104 of the volatile memory space 100.

In some examples, the shared memory object 108 may reside within a page cache. The page cache is where files are buffered and from which memory maps are honored. User-space executables are also paged from the page cache. For the big key type, an actual internal file is created and exists within the page cache. The kernel may swap bits of the internal file to non-volatile memory if needed. But, if the system needs to use the bits that were paged out, then the kernel will bring that data back into volatile memory as needed.

Figure 2:
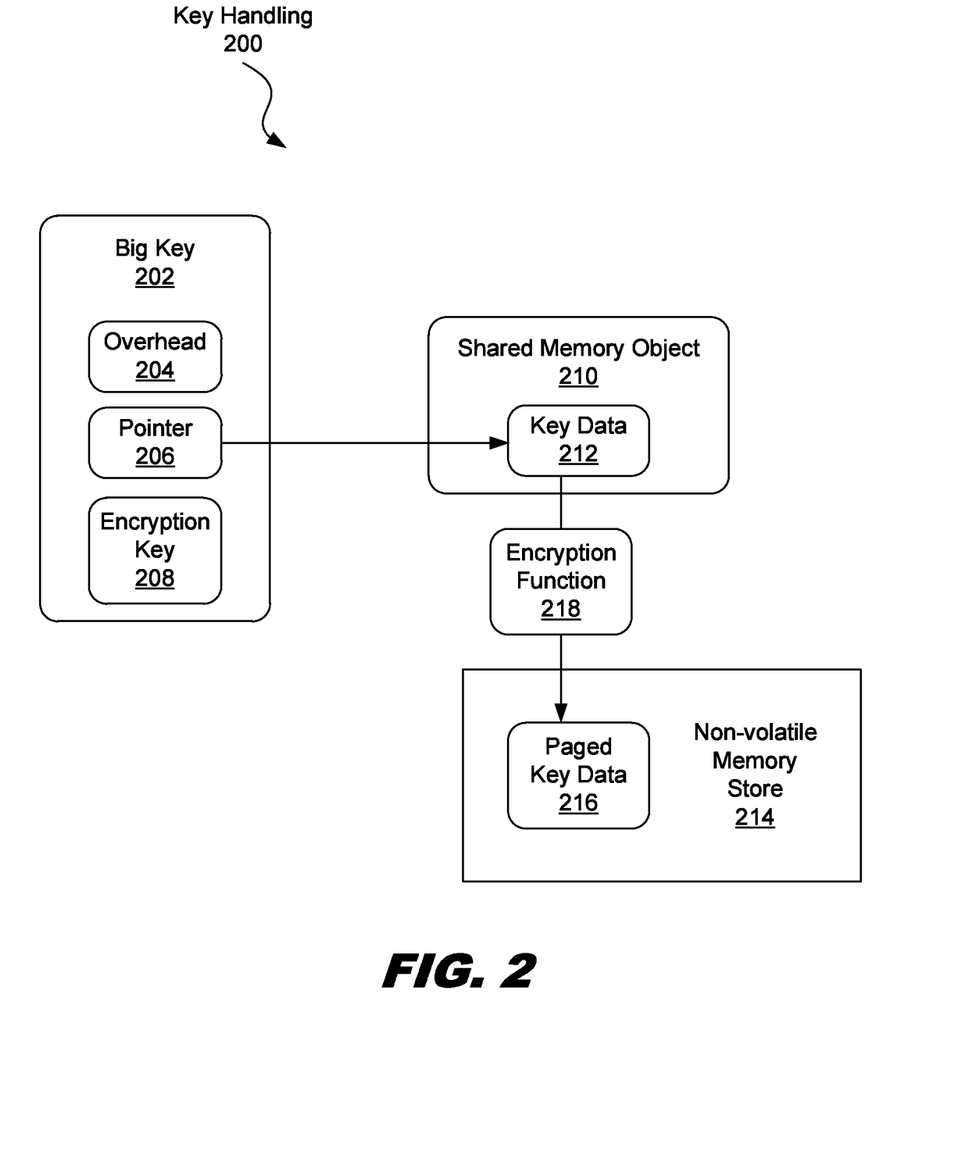
FIG. 2 is a diagram showing illustrative features of key handling, according to one example of principles described herein.

FIG. 2 is a diagram showing illustrative features of key handling. According to certain illustrative examples, an instance of a big key data type 202 may include overhead 204, and a symmetric encryption key 208 in addition to the pointer 206. The overhead is used for constructing and maintaining the shared memory object 210. The symmetric encryption key 208 may be used to encode the data within the shared memory object 210 in case that data gets paged out to a non-volatile memory store 214.

The overhead 204 includes information that may be used to construct and maintain the shared memory object 210, including the pointer 206 and the encryption key 208. For example, the shared memory object 108 may be a shmem file. The framework for the shmem file may already be present within the computing system utilizing principles described herein. The key data 212 stored within the pageable portion of the volatile memory store may be a nameless file.

A file system may be represented in memory using file system structures such as dentries and inodes. Inodes are objects that represent an underlying file, or directory. A dentry is an object that includes a string name (the actual name of the directory), a pointer to an inode (the inode for the respective directory), and a pointer to the parent dentry. A root dentry includes a pointer that points to itself rather than a parent directory.

The dentries, inodes, and other overhead data may take up a substantial amount of memory, depending on the nature of the file system, or characteristics of the computing system. Thus, in some cases, it may not be worth it to move the key data 212 from the kernel memory to the pageable memory if the overhead data 204 is larger than the key. Thus, the big key type may include logic for determining if the overhead that would be required to put the key data 212 into pageable memory exceeds the size of the key data 212. If the overhead is greater than the key data 212, then it is not worth moving the key data 212 to pageable memory. If, however, the overhead 204 is less than the size of the key data 212, then the key data 212 is moved into pageable memory. Putting the data into pageable memory space frees up the overall memory pool because the data is able to be paged out to a secondary storage if necessary.

Because the key data 212 is placed into pageable memory, it is possible that the key data 212 will get paged out to a non-volatile memory store 214. For security purposes, some computing systems may erase data that has been paged from working memory to a non-volatile memory store 214 when the system is shutdown. But, if the system is not shutdown properly, the paged key data 216 may remain in the non-volatile memory store 214. To provide additional security, the paged key data 216 may be encrypted with a symmetric encryption function 218 to protect the data.

A symmetric encryption function 218 uses a single encryption key 208 that is used for both encryption and decryption. The encryption key 208 may be stored within the kernel key ring with the appropriate big key instance 202. Thus, if one with malicious intent were to obtain the paged key data 216 from the non-volatile memory store after interrupting power to the computing system, the paged key data 216 would be encrypted and thus unrecoverable. Moreover, the encryption key 208 is not accessible because it remains within the kernel memory and is never paged out to the non-volatile memory store. Thus, the encryption key 208 would be lost if power to the system is no longer being provided.

The encryption function 218 may be implemented in a variety of ways. For example, the logic for applying the encryption function may be managed by the kernel. The encryption function 218 may be applied to the key data 212 before the key data 212 is placed in the shared memory object 210. In some examples, however, the encryption function 218 may be applied after the key data 212 is placed in the shared memory object 210 but before the key data 212 is paged out to a non-volatile memory store 214.

Thus, the big key instances stored within the kernel memory may include overhead data 204 such as inodes and dentries, a pointer 206 to the key data 212 stored in the shared memory object 210, and an encryption key 208 used to encrypt the key data 212. The actual key data 212 for each big key instance is moved to its own shared memory object within the pageable memory space. This frees up more room within working memory for other applications because the data is able to be paged out. Security is maintained because the overhead data 204 and encryption key 208 stays within the non-pageable memory space.

Figure 3:
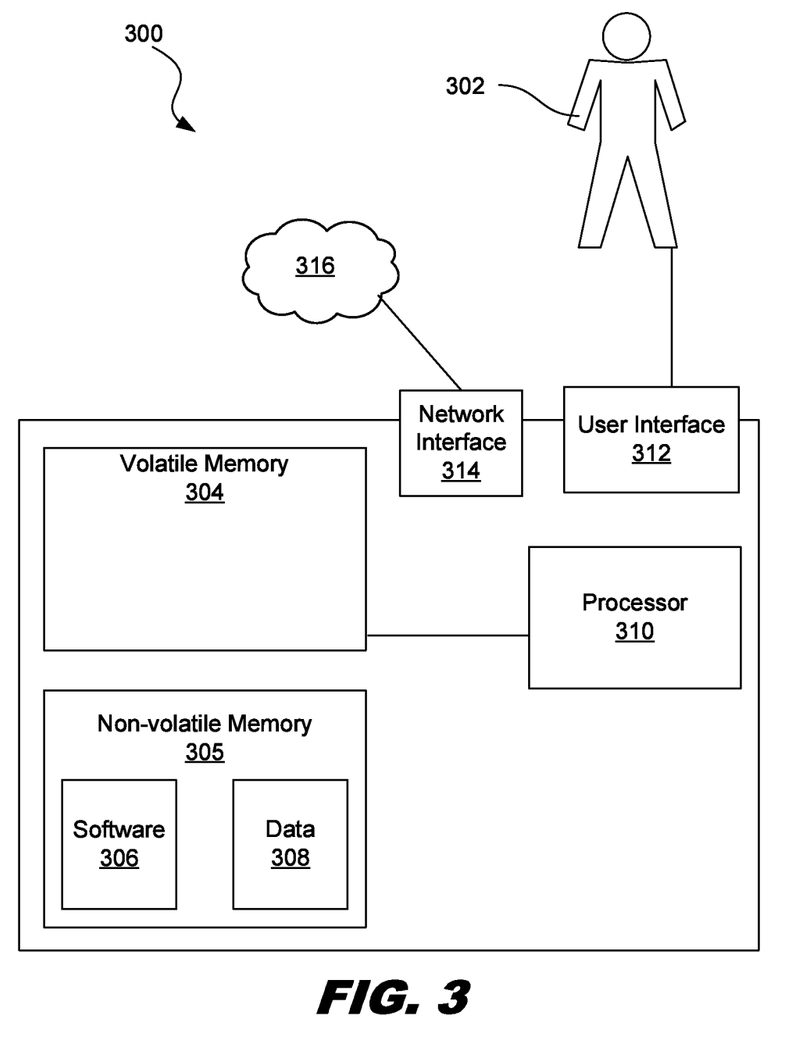
FIG. 3 is a diagram showing an illustrative computing system that may be used for key handling, according to one example of principles described herein.

FIG. 3 is a diagram showing an illustrative computing system that may be used for key handling, according to one example of principles described herein. According to certain illustrative examples, the computing system 300 includes a volatile memory 304 and a non-volatile memory 305. The non-volatile memory may store software 306 and other data 308. The computing system 300 also includes a processor 310, a network interface 314, and a user interface 312.

The volatile memory 304 may include RAM and processor caches. Volatile memory stores data only when power is being supplied. Thus, when power is interrupted, all data stored in volatile memory is lost. Volatile memory typically has a much higher access speed than various types of non-volatile memory storage.

The non-volatile memory 305 may be one of several different types of memory including, but not limited to hard disks and solid state drives. Non-volatile memory typically has longer access times but will maintain the data stored thereon even after power is no longer being supplied. The non-volatile memory 305 may store software 406 or machine readable instructions. The non-volatile memory 305 may store other data 308 as well.

As described above, the volatile memory 304 may include pageable memory space and non-pageable memory space. The kernel memory resides within the non-pageable memory space. Instances of the big key data type may move some data, particularly the key data, out to the pageable memory space, where it may be paged out to the non-volatile memory 305.

The computing system 300 also includes a processor 310 for executing the software 306 and using or updating the data 308 stored in memory 305. The software 306 may include an operating system and various other software applications. The software 306 may also include the kernel.

The user interface 312 may include a number of input devices such as a mouse, touchpad, or touchscreen that allow the user 302 to interact with a graphical user interface (GUI). The user interface 312 may also include a number of different types of output devices such as a monitor or a touchscreen. The user interface allows the user 302 to interact with the computing system 300.

The network interface 314 may include hardware and software that allows the computing system 300 to communicate with other computing systems over a network 316. The network interface 314 may be designed to communicate with the network 316 through hardwire media such as Ethernet, coaxial, fiber-optic, etc. The network interface 316 may also be designed to communicate with the network 316 using wireless technologies.

Figure 4:
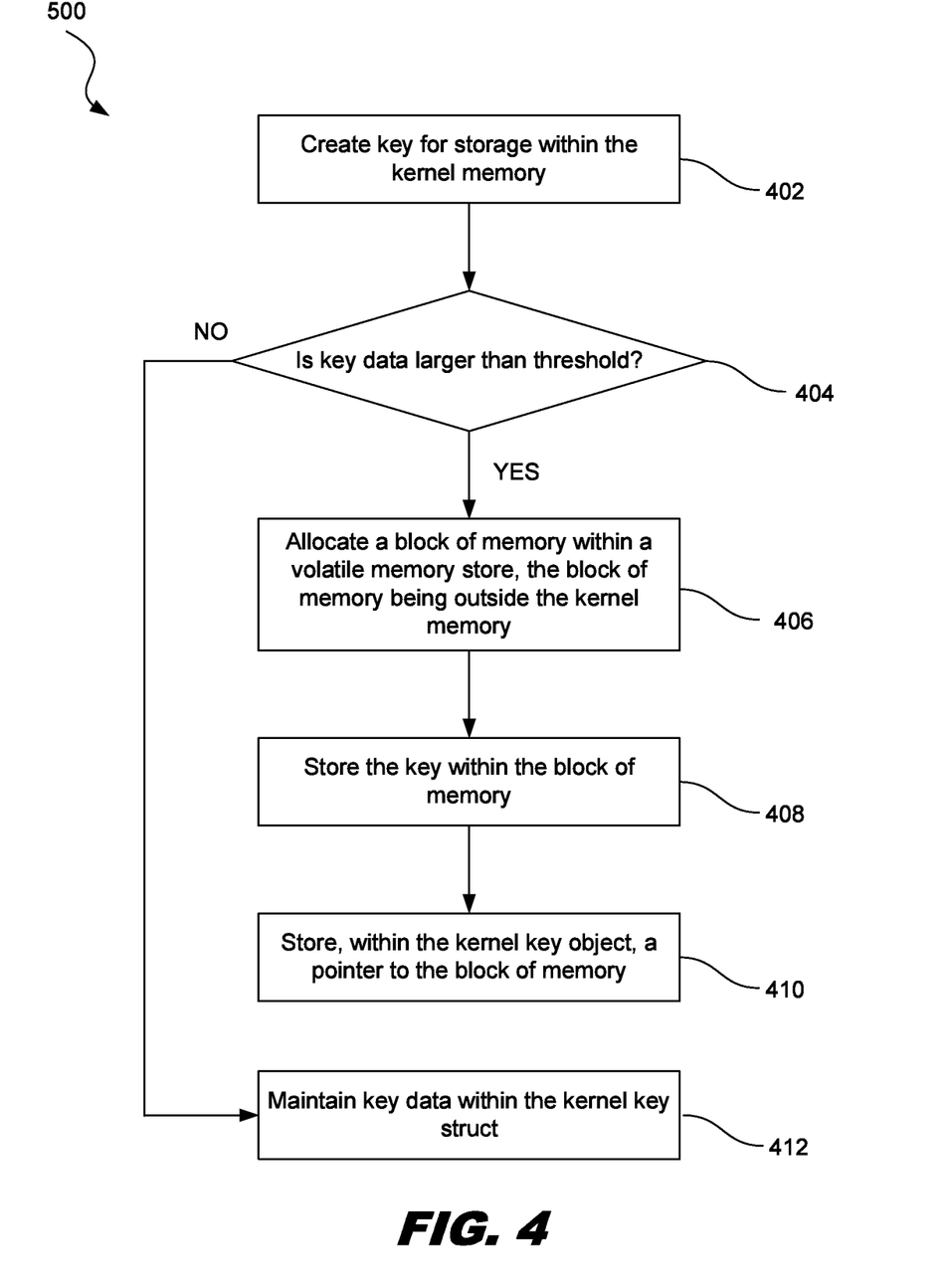
FIG. 4 is a flowchart showing an illustrative method key handling, according to one example of principles described herein.

FIG. 4 is a flowchart showing an illustrative method 400 for key handling. According to certain illustrative examples, the method 400 includes a step 402 for creating a key for storage within the kernel memory. The key may be of a specific data type, which will be referred to as the big key data type. The kernel memory includes logic for handling keys having the big key data type.

According to the present example, the method 400 further includes a step for determining if the key data within the big key is larger than a threshold amount. If the key data is not larger than the threshold amount, then the method 400 proceeds to step 412, wherein the key data is maintained within the kernel memory. If, however, the key data is indeed larger than the threshold amount, the method proceeds to step 406.

The threshold amount may be a size value associated with storing the key data outside of the kernel memory. For example, the threshold amount may correspond to an amount of overhead data used to securely construct a shared memory object within the pageable memory space. This particular threshold value may be calculated by determining what objects and data structures would be used to create the shared memory object as described above. The size of those data structures and objects can then be determined. In some examples, however, no calculation is done. Rather, a constant value is selected as the threshold value. The constant value may be based on the average size of overhead data used to store the data outside of the kernel memory. In some computing systems, the overhead data may be a fixed size, depending on how the file system structures are implemented.

According to the present example, the method 400 includes a step 406 for allocating a block of memory within a pageable memory space. The block of memory may be set up as a shared memory object. The overhead data required to set up such a shared memory object may be maintained within the kernel memory in association with the big key instance that created the shared memory object. The big key instance may also be referred to as the kernel key object.

The method further includes a step 408 for storing the key data within the block of memory. Thus, the key data is stored within the pageable memory space and does not take away from the pool of available memory. Security is maintained because the shared memory object is set up and maintained by the kernel. Additionally, the means to access the key data within the shared memory object remains within the kernel memory.

The method further includes a step for storing, within the kernel memory in association with the appropriate kernel key object, a pointer to the block of memory. The pointer references the physical memory address at which the key data is stored. Thus, the kernel can access the key data as needed. Using the method described above, the key data remains secure while taking less space from the available memory pool.

Figure 5:
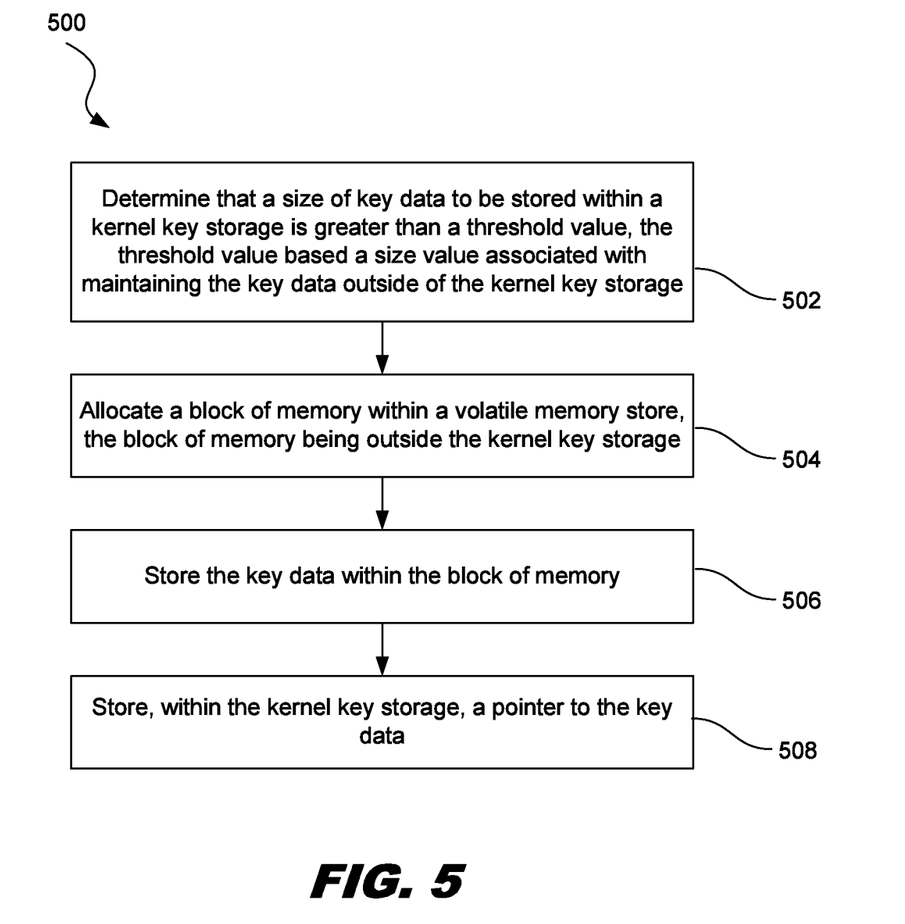
FIG. 5 is a flowchart showing an illustrative method key handling, according to one example of principles described herein.

FIG. 5 is a flowchart showing an illustrative method key handling. According to the present example, the method includes a step 502 for creating an instance of a big key data type for storage within a kernel memory, the memory being a non-pageable portion of a volatile memory store. The method further includes a step 504 for creating a shared memory object in a pageable portion of the volatile memory store. The method further includes a step 506 for storing key data associated with the instance within the shared memory object. The method further includes a step for storing within the kernel memory, a pointer to the shared memory object.

Some examples of processing systems described herein may include non-transient, tangible, machine readable media that include executable code that when run by one or more processors (e.g., processor 310) may cause the one or more processors to perform the processes of methods 400 and 500 as described above. Some common forms of machine readable media that may include the processes of methods 400 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   determining that a size of key data to be stored within a kernel memory is greater than a kernel memory threshold value, wherein the kernel memory threshold value represents a size of data in kernel memory required to store data outside of the kernel memory;
   allocating a block of memory within a volatile memory store, the block of memory being outside the kernel memory;
   storing the key data within the block of memory; and
   storing, within the kernel memory, a pointer to the key data.

2. The method of claim 1, wherein data stored within the kernel memory is designated non-pageable.

3. The method of claim 1, wherein the size of data in kernel memory required to store data outside of the kernel memory is associated with a size of overhead data attributable to maintaining the key data outside of the kernel memory.

4. The method of claim 3, wherein the overhead data includes the pointer.

5. The method of claim 3, wherein the overhead data comprises file system structures.

6. The method of claim 1, wherein the block of memory is designated as pageable.

7. The method of claim 1 wherein the block of memory is a shared memory object constructed and maintained by the kernel.

8. The method of claim 1, wherein the key data is stored within a shmem file within the block of memory.

9. The method of claim 1, further comprising, paging out the key data stored within the block of memory to a non-volatile memory store.

10. The method of claim 9, further comprising, encrypting the key stored in the non-volatile memory store.

11. The method of claim 10, further comprising, storing an encryption key for the key data stored in non-volatile memory within the kernel memory.

12. A method for key handling, the method performed by a computing system, the method comprising:
creating an instance of a big key data type for storage within a kernel memory, the kernel memory being a non-pageable portion of a volatile memory store; and
in response to determining that a size of key data for the big key data type is greater than a size of data in kernel memory required to store data outside of the kernel memory:
creating a pageable shared memory object in the volatile memory store;
storing the key data within the shared memory object; and
storing within the kernel memory and in association with the instance, a pointer to the shared memory object and overhead data for the shared memory object.

13. The method of claim 12, wherein the overhead data includes file system structures.

14. The method of claim 12, further comprising paging the key data to a non-volatile memory store.

15. The method of claim 14, further comprising, encrypting the key data with a symmetric encryption key.

16. The method of claim 15, further comprising, storing the encryption key within the kernel memory in association with the instance.

17. A computing system comprising:
a processor; and
a memory comprising machine readable instructions that when executed by the processor, cause the system to:
create a key for storage within a non-pageable kernel memory;
determine that a size of the key is greater than a size of data in kernel memory required to store data outside of the kernel memory;
allocate a pageable block of memory within a volatile memory store, the block of memory being outside the kernel memory;
store the key within the pageable block of memory; and
store, within the kernel memory, a pointer to the block of memory and the overhead.

18. The system of claim 17, wherein the block of memory comprises a shared memory object constructed and maintained by a kernel of the system.

19. The system of claim 17, wherein the machine readable instructions further cause the processor to:
page the key to a non-volatile memory store;
encrypt the key data with an symmetric encryption key; and
store the encryption key within the kernel memory.

20. The system of claim 17, wherein the size of the data in kernel memory required to store data outside of kernel memory includes allows for a pointer and a system structure.

* * * * *